May 7, 1963 C. E. KLAMM 3,088,755
BRACKET MOUNTING OF TUBE FITTINGS
Filed May 31, 1957
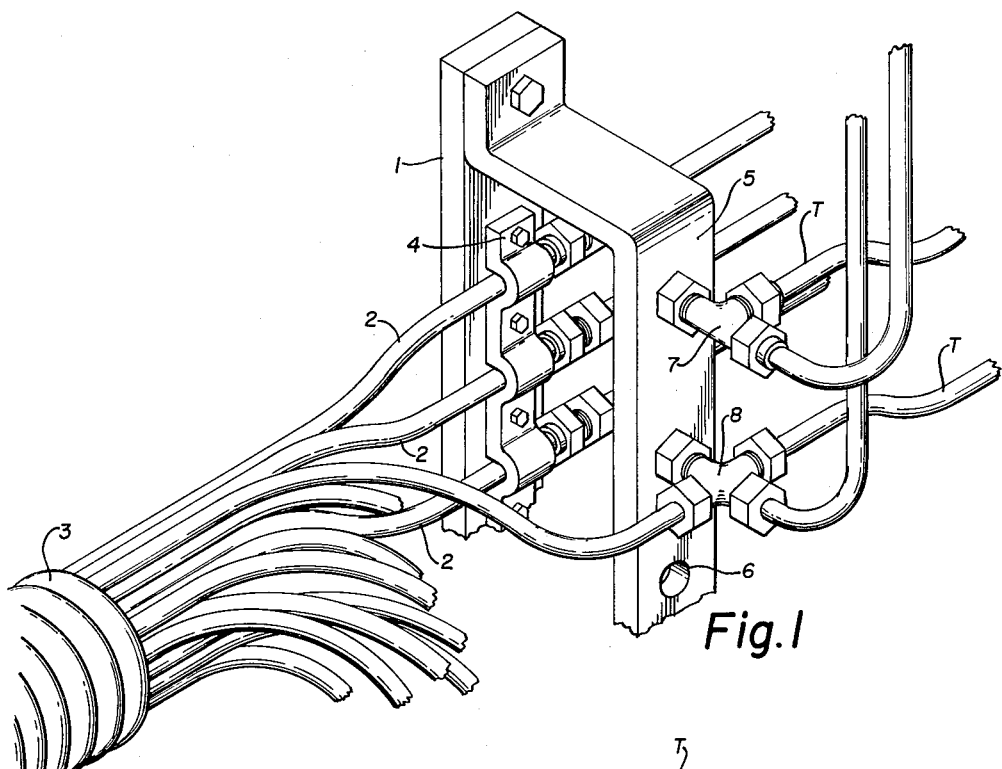
Fig.1
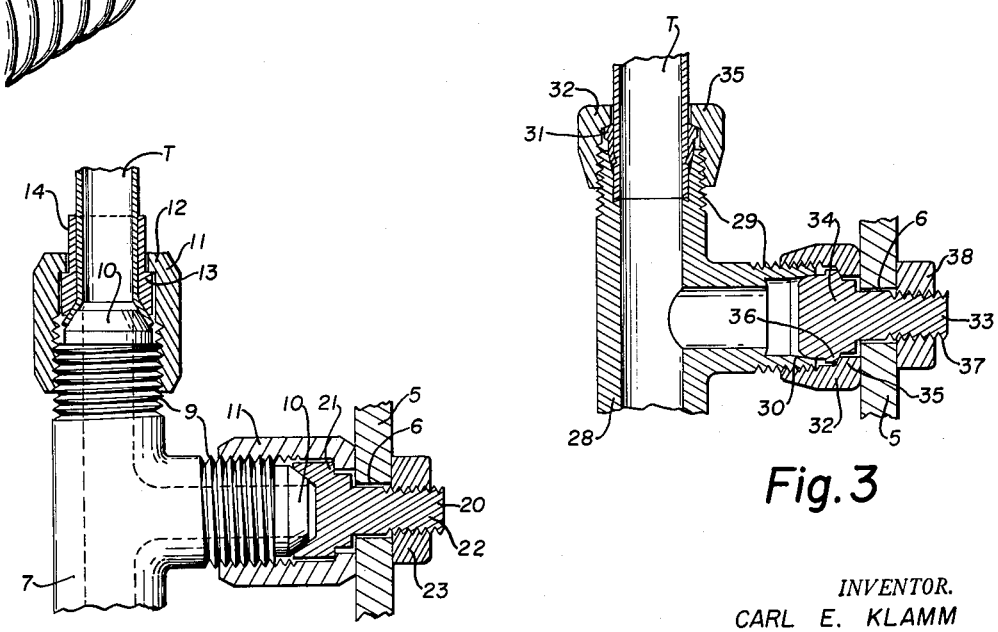
Fig.2
Fig.3
INVENTOR.
CARL E. KLAMM
BY Oberlin & Limbach
ATTORNEYS United States Patent Office 3,088,755
Patented May 7, 1963

3,088,755
BRACKET MOUNTING OF TUBE FITTINGS
Carl E. Klamm, Lakewood, Ohio, assignor to Parker-Hannifin Corporation, Cleveland, Ohio, a corporation of Ohio
Filed May 31, 1957, Ser. No. 662,736
2 Claims. (Cl. 285—64)

The present invention relates generally as indicated to the bracket mounting of tube fittings and has for its principal object the provision of a simple mounting means which, in conjunction with a conventional fitting nut, may be employed to secure said fitting on a bracket by one of its several legs.

More particularly, with the present mounting means one leg of a conventional tube fitting T or cross is converted to a support whereby the remaining fitting legs constitute either a straight connector or an elbow (in the case of a T) or a T (in the case of a cross) to which tubes are connected in conventional manner. From the foregoing it can be seen that the tube fitting manufacturer, distributor, and user, need only make or stock a standard line of T's and crosses and appurtenant parts, such as nuts and sleeves for flared tube fittings and nuts and ferrules for flareless tube fittings, and a line of mounting adapters and lock nuts, whereby, when it is desired to mount such standard T or cross on a bracket it is only necessary to assemble an adapter on one leg of the fitting using a standard appurtenant part i.e. the nut, for that purpose and then inserting the threaded shank of said adapter through a hole in the mounting bracket or plate, whereupon, by screwing the lock nut on said adapter, the assembly is clamped tightly on the bracket with the remaining fitting ports or legs disposed in any desired rotary position.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a fragmentary perspective view showing several tube fitting T's and crosses mounted on a bracket by the means constituting the present invention;

FIG. 2 is a cross-section view on enlarged scale showing the mounting means adapted for use with a typical flared tube fitting; and FIG. 3 is a similar enlarged cross-section view showing the mounting means adapted for use with a typical ferrule or "flareless" tube fitting.

Referring first to FIG. 1, the base 1 of the bracket herein shown has mounted thereon a series of tubes 2 emerging from a cable 3, the mounting means including a strap 4 in the form of a gang tube clip. Said bracket also includes another strap 5 which is secured to base 1 in spaced relation, and which is formed with a series of holes 6 therethrough which constitute mounting holes for the T's 7 or crosses 8.

In the case of conventional flared tube fittings, each T or cross (see FIG. 2), has externally threaded legs 9 which terminate in frusto-conical seats or noses 10 with which the flared ends of the respective tubes T are engaged. The flared ends of said tubes T are clamped against said conical noses 10 as by means of nuts 11 which are threadedly engaged with respective fitting legs 9 and which are formed with inturned flanges 12 engaged with complementary shoulders 13 of the clamping sleeves 14, said sleeves 14 being formed with frusto-conical surfaces that engage the outer surfaces of the respective tube flares.

When the tube fitting T 7 (or cross 8) is of the type adapted for coupling with flared tubes, the mounting adapter 20 is formed with a frusto-conical recess equivalent to the inside of the tube flare and with a shoulder 21 equivalent to the shoulder 13 on the sleeve 14 aforesaid, whereby said mounting adapter 20 may be drawn tightly against one of the noses 10 of the fitting by using the conventional fitting nut 11. The shank 22 of the mounting adapter 20 is externally threaded as shown, so as to extend through a mounting hole 6 of the bracket 5 and, upon tightening of the lock nut 23 onto said shank 22, the fitting assembly is firmly clamped in place, the outer end of the nut 11 frictionally engaging the bracket 5. It is to be noted that the entire fitting assembly may be rotated about the axis of the shank 22 of the mounting adapter 20 to position the other legs 9 of the fitting as desired.

Accordingly, that leg of the fitting to which mounting adapter 20 is assembled is plugged or sealed, whereby the remaining two or three legs 9, as the case may be, may be used for connection of flared tubes T thereto, using the nuts 11 and sleeves 14 previously described.

The form of the mounting adapter for a typical flareless tube fitting 28 is shown in FIG. 3 and in that case the legs 29 are also externally threaded and are formed with interior frusto-conical cam surfaces 30 which are effective to contract ferrules 31 when forced axially by the nuts 32 that are threadedly engaged with said legs. In this way, each ferrule 31 makes sealed engagement with the cam surface 30 engaged thereby and with the exterior surface of the tube T therewithin. In addition, each ferrule 31 when contracted at its inner end bites into the tube to securely hold the latter against axial withdrawal from the fitting 28.

In FIG. 3 the mounting adapter 33 is formed with a head 34, the inner end of which corresponds generally to the inner end of the ferrule 31 so as to make sealed engagement with the flare mouth or cam surface 30 of the fitting when said mounting adapter 33 is clamped to the fitting 28 by the nut 32, said nut having an inturned flange 35 engaging the shoulder 36 of the mounting adapter 33. Again, as in the form of the invention illustrated in FIG. 2, the mounting adapter 33 has a threaded shank 37 which extends through a hole 6 in the mounting bracket 5 and, upon tightening of the lock nut 38 on said shank the fitting assembly is firmly secured on said mounting bracket 5 with the outer end surface of the nut 32 frictionally engaging the mounting bracket 5. Also, as aforesaid, the fitting body 28 and mounting adapter 33 may be bodily rotated about the axis of the latter to position the ports or legs 29 of the fitting body in any desired rotary position.

Accordingly, the present invention facilitates the mounting of flared or flareless tube fittings on a bracket 5 simply by using any leg of a T or cross or other multiple port fitting as a mounting leg through the intermediary of a mounting adapter 20 or 33 that seals or plugs that leg in much the same manner as the seal between the tube flare and leg or between the ferrule and leg is ordinarily accomplished. With such mounting adapter 20 or 33 and a lock nut 23 or 38 threaded thereonto, a conventional flared or flareless tube fitting may be mounted on a bracket whereby the fitting manufacturer does not have to make a special line of fittings for bracket mounting, nor does the distributor or customer need to order and stock anything other than the conventional tube fittings and appurtenant parts together with the simple mounting adapters 20 or 33 and lock nuts 23 or 38.

Other modes of applying the principle of the invention may be employed, change being made as regards the details described, provided the features stated in any of the following claims, or the equivalent of such, be employed.

I therefore particularly point out and distinctly claim as my invention:

1. In combination, a mounting bracket having a hole therethrough, a multi-leg tube fitting having nuts threaded on the respective legs for joining tubes thereto, a mounting adapter clamped to a leg of said fitting by the associated nut and constituting a closure for that leg of said fitting, said adapter having an imperforate threaded shank extending through said one nut and through the hole in said bracket with the axially outer end face of said one nut abutting said bracket, and a locknut screwed onto said shank to clamp said bracket between said one nut and said locknut.

2. Means for mounting a multi-leg tube fitting upon a bracket, such tube fitting having fitting nuts threaded on the respective legs for joining tubes thereto; said means comprising a mounting adapter having an imperforate threaded shank adapted to extend through a hole in such bracket and being formed with a shoulder for clamping of said adapter to a leg of such tube fitting, a fitting nut for such leg of the tube fitting provided with a complemental shoulder engageable with the shoulder of said adapter to so clamp the latter to such fitting, said adapter, when clamped to such fitting, constituting a closure for such leg, and a locknut threaded on said shank for clamping such bracket between said fitting nut and said locknut, the axially outer end face of said fitting nut and the aixally inner end face of said locknut being the nearest opposed faces of said means that are adapted to be disposed on opposite sides of such bracket whereby, when said locknut is tightened, such bracket will be frictionally engaged between said fitting nut and said locknut.

References Cited in the file of this patent
UNITED STATES PATENTS

| | | |
|---|---|---|
| 475,754 | Clifford | May 31, 1892 |
| 579,777 | Sergeant | Mar. 30, 1897 |
| 985,744 | Jenkins | Feb. 28, 1911 |
| 1,042,587 | Moore | Oct. 29, 1912 |
| 1,153,282 | Zahm | Sept. 14, 1915 |
| 1,585,541 | Drust | May 18, 1926 |
| 1,861,314 | McAndrew | May 31, 1932 |
| 1,903,819 | Kocher | Apr. 18, 1933 |
| 1,940,135 | Luchs | Dec. 19, 1933 |
| 2,396,163 | Dies | Mar. 5, 1946 |
| 2,599,280 | Phillips | June 3, 1952 |
| 2,625,955 | Day | Jan. 20, 1953 |

FOREIGN PATENTS

| | | |
|---|---|---|
| 131,818 | Austria | Feb. 10, 1933 |